(12) United States Patent
Geissdörfer et al.

(10) Patent No.: US 7,107,119 B2
(45) Date of Patent: Sep. 12, 2006

(54) CONTROLLER FOR A MACHINE TOOL OR PRODUCTION MACHINE

(75) Inventors: Klaus Geissdörfer, Erlangen (DE); Peter Schiffer, Schönaich (DE)

(73) Assignee: Siemens Aktiengesellschaft, München (DE)

( * ) Notice: Subject to any disclaimer, the term of this patent is extended or adjusted under 35 U.S.C. 154(b) by 49 days.

(21) Appl. No.: 10/973,666

(22) Filed: Oct. 26, 2004

(65) Prior Publication Data

US 2005/0149212 A1 Jul. 7, 2005

(30) Foreign Application Priority Data

Oct. 27, 2003 (DE) ................................. 103 50 072

(51) Int. Cl.
G06F 19/00 (2006.01)
G05B 19/42 (2006.01)
G05B 11/01 (2006.01)
G06F 9/44 (2006.01)

(52) U.S. Cl. ............ 700/181; 700/180; 700/160; 700/23; 700/86; 717/100; 717/101; 717/168; 717/174

(58) Field of Classification Search ............ 700/17, 700/18, 23, 86, 87, 88, 180, 181, 160, 169, 700/170; 717/100, 101, 168, 174
See application file for complete search history.

(56) References Cited

U.S. PATENT DOCUMENTS

| | | | |
|---|---|---|---|
| 5,453,933 A * | 9/1995 | Wright et al. ............... 700/181 |
| 5,889,672 A * | 3/1999 | Schuler et al. ............... 700/83 |
| 6,275,741 B1 * | 8/2001 | Choi ............................. 700/200 |
| 6,643,555 B1 * | 11/2003 | Eller et al. ..................... 700/83 |
| 2003/0102367 A1 * | 6/2003 | Monette et al. ............. 235/376 |
| 2005/0137727 A1 * | 6/2005 | Feuerbach et al. ........... 700/87 |

FOREIGN PATENT DOCUMENTS

DE 198 53 205 A1 6/2000

OTHER PUBLICATIONS

Przywara, A., "Entwicklung und Bewertung einer deterministischen Prozessregelung unter RTLinux auf einem eingebetteten System mit Nutzung der Funktionalität von Standard Linux", Diplomarbeit, Technische Universität Berlin, Mar. 2002, pp. 1-155.

* cited by examiner

Primary Examiner—Ramesh Patel
(74) Attorney, Agent, or Firm—Henry M. Feiereisen

(57) ABSTRACT

A controller for a machine tool or production machine is disclosed. The controller includes system software that implements a control function for the machine tool or production machine, real-time basic application software and real-time custom-designed application software for expanding the system software, and a software interface allowing the real-time basic application to access data and functions of the system software. The controller further includes a custom-designed software interface provided by the basic application software for communication between the basic application software and the custom-designed application software. With the disclosed controller, custom-designed application software can be integrated in the system software of the controller without detailed information about the system software of the controller.

2 Claims, 3 Drawing Sheets

CONTROLLER FOR A MACHINE TOOL OR PRODUCTION MACHINE

CROSS-REFERENCES TO RELATED APPLICATIONS

This application claims the priority of German Patent Application, Serial No. 103 50 072.3, filed Oct. 27, 2003, pursuant to 35 U.S.C. 119(a)–(d), the disclosure of which is incorporated herein by reference.

BACKGROUND OF THE INVENTION

The present invention relates to a controller for a machine tool or a production machine, and more particularly to an interface for the controller.

Nothing in the following discussion of the state of the art is to be construed as an admission of prior art.

Controllers for machine tools or production machines typically include system software performing the control functions. The system software is often supplied by the manufacturer as a single design type and is typically reconfigured, rather than modified, to produce different variations that have better performance and require less maintenance. User-specific functions or other special functions that run efficiently on standard system software can be imported into modern software systems by having the manufacturer implement an open system in the system's real-time area. The functionality of the software can be substantially enhanced independent of the development cycle of the system software through additional so-called application software, subsequently referred to as basic application software. The basic application software can access data and functions of the system software through an open software interface.

Various groups of users take advantage of the possibility to integrate basic application software with existing system software through a general and typically high-capacity software interface, for example:

a) the manufacturer of the controller can develop custom-designed functionality,
b) the manufacturer of the machine can introduce proprietary know-how by developing technologically advanced and/or machine-specific features, which would distinguish the manufacturer from competitors in spite of the use of "standard software," thereby obtaining a market lead,
c) solution providers can introduce proprietary know-how in the controller in form of special functions by offering the end-customer additional support and services that the manufacturer of the controller cannot or will not offer,
d) academic and other institutions intending to develop solutions in form of prototypes based on an industrial standard system.

To satisfy the aforementioned groups of users, the system software offers the possibility to integrate additional basic application software via a general open software interface, generally referred to as an open system.

However, using a general open software interface, through which the basic application software can access files and functions of the system software, is rather complex and may involve expensive training before this software interface can be successfully employed. In addition, machine builders, solution providers, universities and institutions may also lack the detailed knowledge of the system software of the machine controller, which thus may increase the likelihood of software errors.

Other problem may arise because of the difficulty to precisely define the responsibility for the system software whose functionality has been extended via a general software interface. It is therefore initially difficult to estimate to what extent the introduced basic application software uses methods and functions that significantly change the functional characteristic of the basic system and/or the execution of the software.

Consequently, only customers of controllers with considerable experience have so far used industrial products that allow introduction of basic application software, because only those customers are capable of appropriately handling documentation, startup and service of the extended products for, for example, an end user.

It would therefore be desirable and advantageous to provide to an improved process for extending the system software of a controller, in particular a controller for a machine tool or production machine, which obviates prior art shortcomings and is able to specifically bind application software to the system software of the controller without significant know-how of the system software of the controller.

SUMMARY OF THE INVENTION

According to one aspect of the invention, a controller for a machine tool or production machine includes system software that implements a control function for the machine tool or production machine, a real-time basic application software and a real-time custom-designed application software for expanding the system software, and a software interface allowing the real-time basic application to access data and functions of the system software. A custom-designed software interface is provided by the basic application software for communication between the basic application software and the custom-designed application software.

According to another aspect of the invention, a controller for controlling a machine tool or production machine includes system software that controls a task of the machine tool or production machine, basic application software executing in real time and interfacing with the system software for accessing data or functions, or both, of the system software, and custom-designed application software executing in real time and interfacing with the basic application software via a custom-designed software interface. The custom-designed application software defines the data or functions, or both, of the system software that are accessible to the custom-designed application software, without requiring the custom-designed application software to have information about the system software.

Such cascaded software interface makes it possible to leave the product responsibility for the individual software components with parties that have the appropriate technical know-how.

Another advantage of this approach is that the executable entire software system can be generated without explicitly requiring binding to the libraries of the system software. Instead, binding can be achieved by loading the software in and dynamically binding the software with the system software. Accordingly, a special software interface can be provided as a software option to the users of this custom-designed open system that is tailored to the particular requirements of the customer, in the same way as a loadable functional extension. In addition, the development environment, in which the applications are developed, can be essentially independent of the environment used for developing the basic system. For example, an application can be developed on a personal computer (PC), whereas the basic system is developed and tested on workstations.

According to an advantageous embodiment of the invention, the basic application software can includes a monitoring functionality for monitoring the custom-designed application software. The basic application software thereby ensures that the custom-designed application software satisfies the monitored requirements.

According to yet another advantageous embodiment of the invention, the monitoring functionality can monitor a runtime of the custom-designed application software. Frequently, an error occurs when the custom-designed application software requires excessive computing resources, preventing data to be processed in real-time. Such error can be recognized by a suitable monitoring mechanism residing in the basic application software.

According to another advantageous embodiment of the invention, the monitoring functionality can monitor a size of machine code of the custom-designed application software. Another possibility for errors is an excessive memory demand by the custom-designed application software. Such error can also be recognized by a monitoring mechanism implemented in the basic application software.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
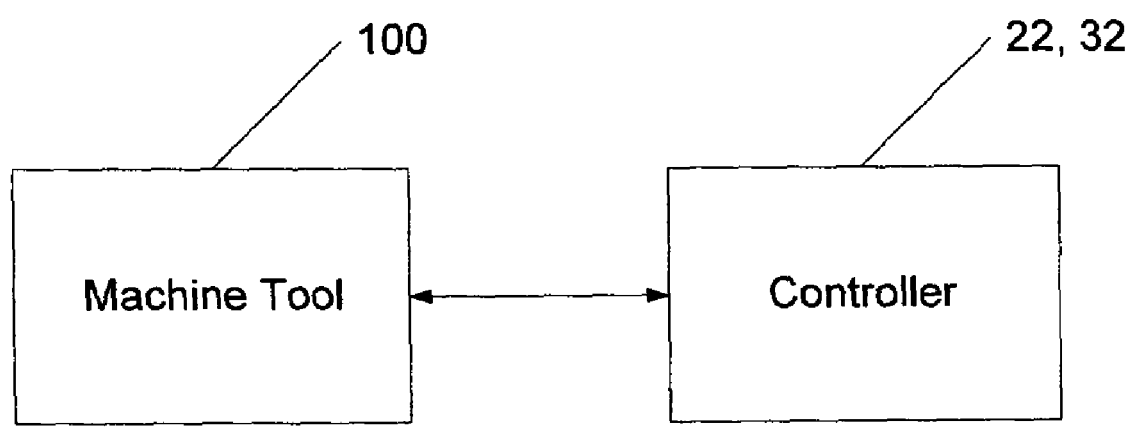
FIG. 1 illustrates schematically a machine tool or production machine interfaced with a controller.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a machine tool or production machine 100 interfaced with a controller 22, 32. The system software of a controller 22, 32 for a machine tool or production machine 100 essentially includes acyclic and cyclic software components. The acyclic software components execute acyclic processes and are fundamentally used to process tasks that do not require real-time processing, such as reading values from a control panel connected to, for example, the controller. The cyclic software components are called cyclically and are used to implement functions of the controller that are processed in real time.

Figure 2:
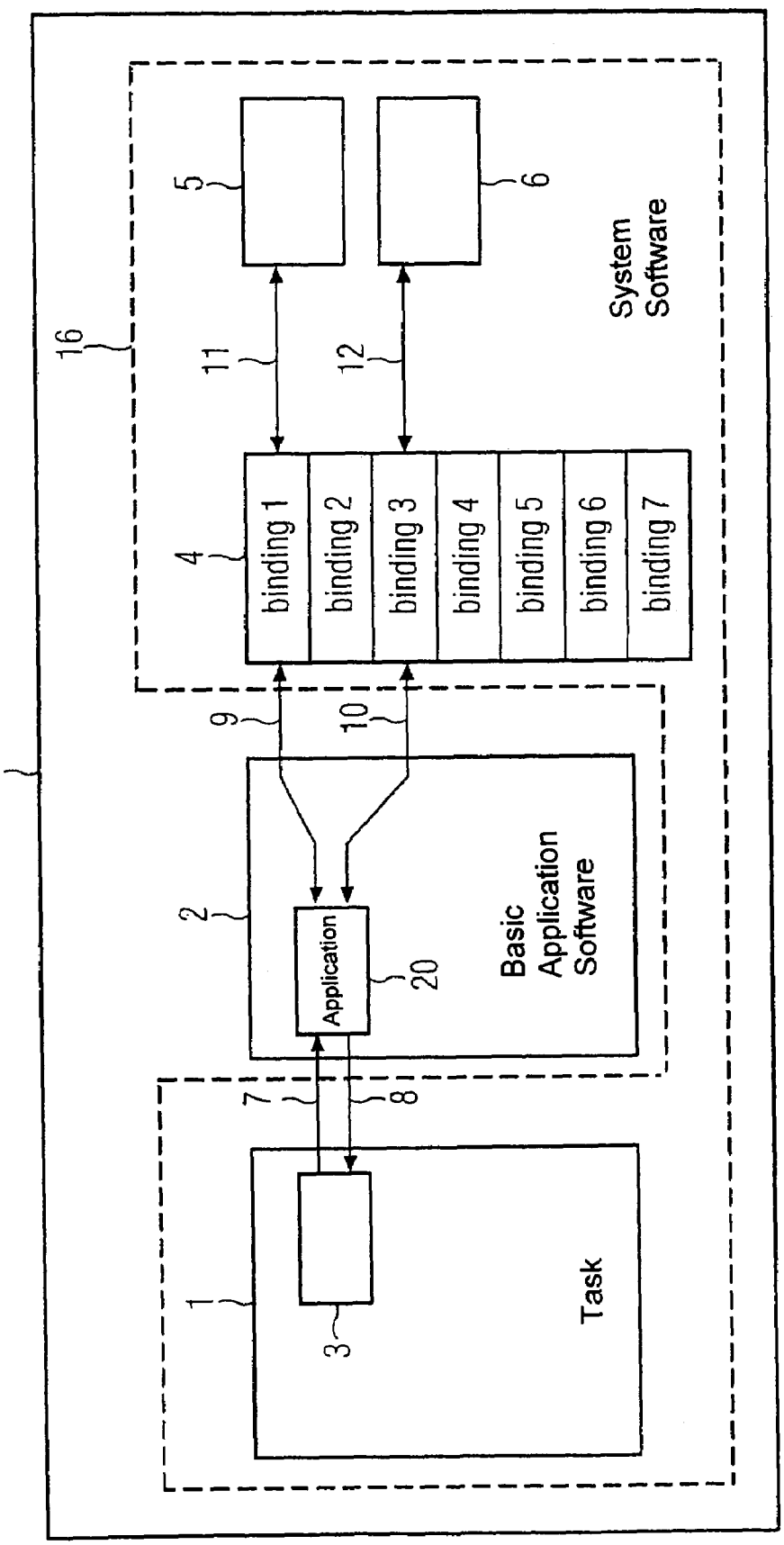
FIG. 2 illustrates in form of a schematic block diagram the software of a conventional controller.

FIG. 2 shows in form of a schematic block diagram the software of a conventional controller 22 for a machine tool or production machine 100. FIG. 2 shows only those cyclic components, i.e., those real-time executable system software components of system software 16 of the controller 22, that are required for an understanding of the invention. The real-time-capable system software components are processed cyclically within a so-called Task, with FIG. 2 showing an exemplary Task 1.

The Task 1 is called and processed cyclically. The Task 1 can, for example, involve computing a travel path of a tool of the machine tool or production machine. While the Task 1 is processed, jumps to, for example, an application 20 that is part of a basic application software can be defined at various user-defined locations. Only one location 3 is depicted for sake of clarity. An exemplary jump 7 is indicated in FIG. 2 by a corresponding arrow. As described above, the manufacturer of the controller 22 or an external user can add basic application software 2 to integrate in the software system custom-designed functionalities in form of individual applications. In the depicted embodiment, after the corresponding application 20 is processed within the basic application software 2, the process executes a return jump 8 and returns to the corresponding Task 1 of the system software 16. In the depicted embodiment, the basic application software 2 includes only a single application 2 for sake of clarity. It will be understood, however, that the basic application software 2 can also include more than one application. One application can be directed, for example, to the computation of a desired value. Both the basic application software 2 and the Task 1 of the system software 16 are processed in real time.

The basic application software 2 and/or the application 20 can access the data 5 of the system software 16 and/or the function 6 of the system software 16 through a general software interface, which is indicated in the illustrated embodiment by arrows 9 and 10, through a so-called binding library 4, which includes a number of so-called bindings (seven exemplary bindings 1 through 7 are shown), and through the software links 11 and 12. The binding library 4 provides through the bindings functions and methods that enable access to the data 5 and/or the function 6 of the system software 16. This arrangement is typically referred to as an open software interface, because the user of the basic application software 2 has access to the implementation and functionality of the various bindings of the binding library 4. As mentioned above, in practice it is difficult to correctly integrate the basic application software 2 in the system software environment, because the producer of the basic application software 2 can be provided via the binding library 4 a number of methods and functions that define access to the data 5 or the function 6 of the system software 16. Therefore, a thorough knowledge of the system software 16 is required to integrate the basic application software 2 in the system software 16.

Figure 3:
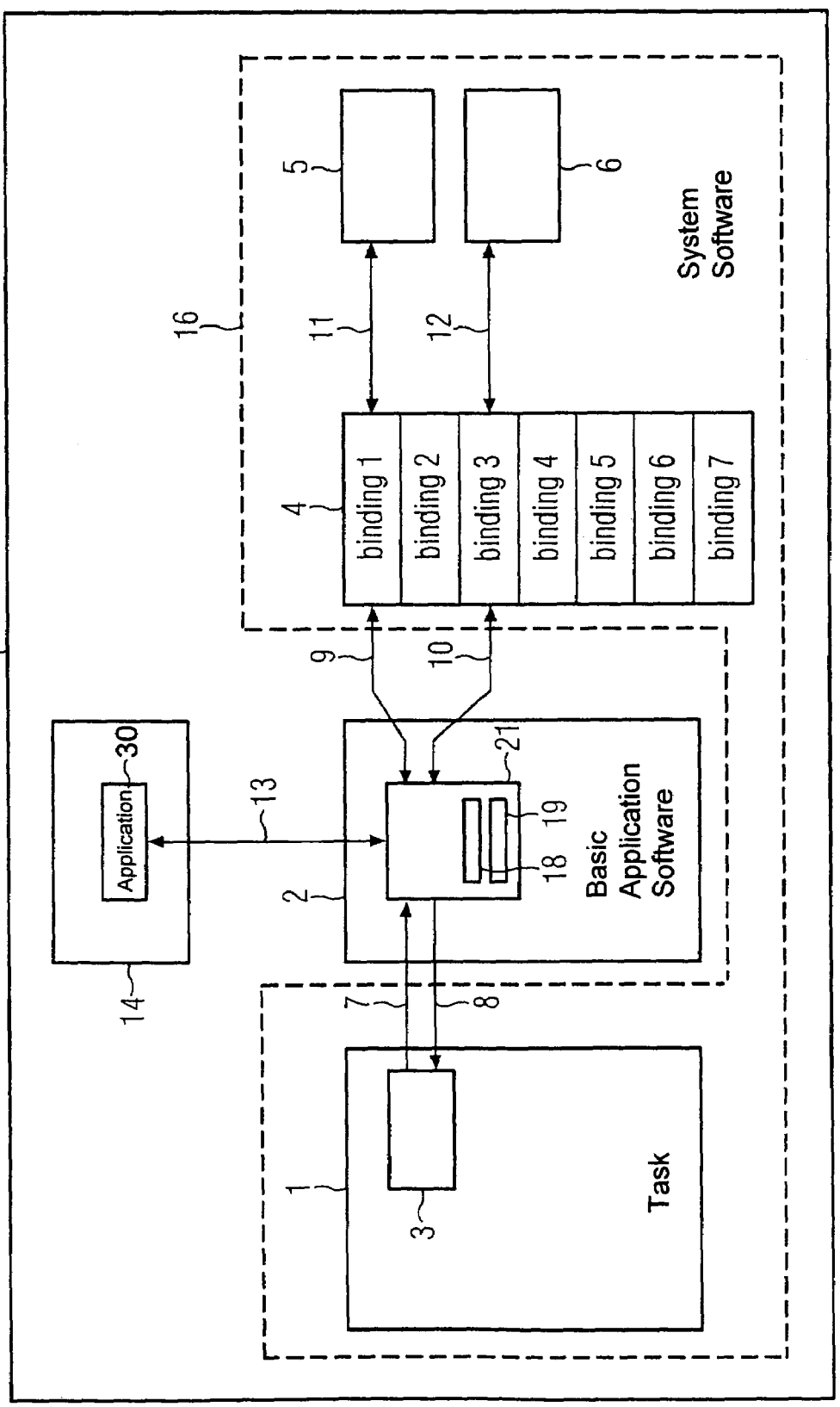
FIG. 3 illustrates in form of a schematic block diagram the software of a controller according to the invention.

FIG. 3 shows in form of a schematic block diagram the software of a controller 32 according to the invention for a machine tool or production machine 100. FIG. 3 shows only those cyclic components, i.e., those real-time executable system software components of system software 16 of the controller 32, that are required for an understanding of the invention. According to the invention, the basic application software 2 provides a custom-designed software interface 13 for communication between the basic application software 2 and a custom-designed application software 14. The custom-designed software interface 13 is thereby adapted to the particular requirements of the custom-designed application software 14. The application 20, which in the embodiment depicted in FIG. 2 is implemented within the basic application software 2, is according to the invention depicted in FIG. 3 implemented as an application 30 that is a component of the custom-designed application software 14. The application 21 within the basic application software 2 provides the custom-designed software interface 13 for communication between the basic application software 2 and the custom-designed application software 14, in particular in the embodiment depicted in FIG. 3 with the application 30. The custom-designed software interface 13 is now implemented by specific agreement with the customer generating the custom-designed application software 14. In this way, it can be specified which data 5 of the system software 16 or functions 6 of the system software 16 the basic application software 2 provides to the custom-designed application software 14, in particular via the custom-designed software interface 13 of application 21. It will be understood, however, that the data 5 or functions 6 can already be pre-processed or processed within the application 21, so that they can be provided to the customer in a clear and understandable form.

The customer who writes the custom-designed application software 14, therefore no longer needs to have information about the system software 16, in particular the binding library 4 and the general software interface 9 and 10. The other components 1, 3, 7, 8, 11, and 12 of FIG. 3 operate in the same manner as the corresponding components in FIG. 2 and therefore have the same reference numerals. The Task 1 of the system software 16 shown in the exemplary embodiment, the basic application software 2, the custom-designed application software 14, the data 5 of the system software 16 as well as the functions 6 of the system software 16 are called cyclically and processed in real-time.

Advantageously, the basic application software 2 can include monitoring mechanisms that can be used to monitor the custom-designed application software 14.

In the embodiment depicted in FIG. 3, a run-time monitoring unit 18 that monitors the run-time of the custom-designed application software 14, and a machine code monitoring unit 19 that monitors the size of the machine code of the custom-designed application software 14, are integrated in the application 21. In this way, frequent errors, such as an excessive run-time of the custom-designed application software 14, that they may therefore no longer be processed in real time, or an excessive size of the machine code of the custom-designed application software 14, which exceeds the memory capacity of the control unit 22, can be monitored and identified by the basic application software 2. It will be understood that the run-time monitoring unit 18 and the machine code monitoring unit 19 can also be executed by dedicated applications within the basic application software 2. In addition, more than one application 30 that communicate via the custom-designed interface 13 with the basic application software 2, can be implemented and executed in the custom-designed application software 14.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A controller for a machine tool or production machine, comprising:
   system software that implements a control function for the machine tool or production machine,
   real-time basic application software and real-time custom-designed application software for expanding the system software, and
   a software interface allowing the real-time basic application to access data and functions of the system software, and
   a custom-designed software interface provided by the basic application software for communication between the basic application software and the custom-designed application software,
   wherein the basic application software includes a monitoring functionality for monitoring a runtime and a size of machine code of the custom-designed application software.

2. A controller for controlling a machine tool or production machine, comprising:
   system software that controls a task of the machine tool or production machine;
   basic application software executing in real time and interfacing with the system software for accessing data or functions, or both, of the system software; and
   custom-designed application software executing in real time and interfacing with the basic application software via a custom-designed software interface of the custom-designed application software,
   said custom-designed application software defining the data or functions, or both, of the system software accessible to the custom-designed application software, without requiring the custom-designed application software to have information about the system software,
   wherein the basic application software includes a monitoring functionality for monitoring a size of machine code and a runtime of the custom-designed application software.

* * * * *